Nov. 19, 1929.   J. W. VAN DENBURG   1,736,293
METHOD AND APPARATUS FOR REPAIRING LEAKY CONDUITS
Filed Dec. 14, 1927
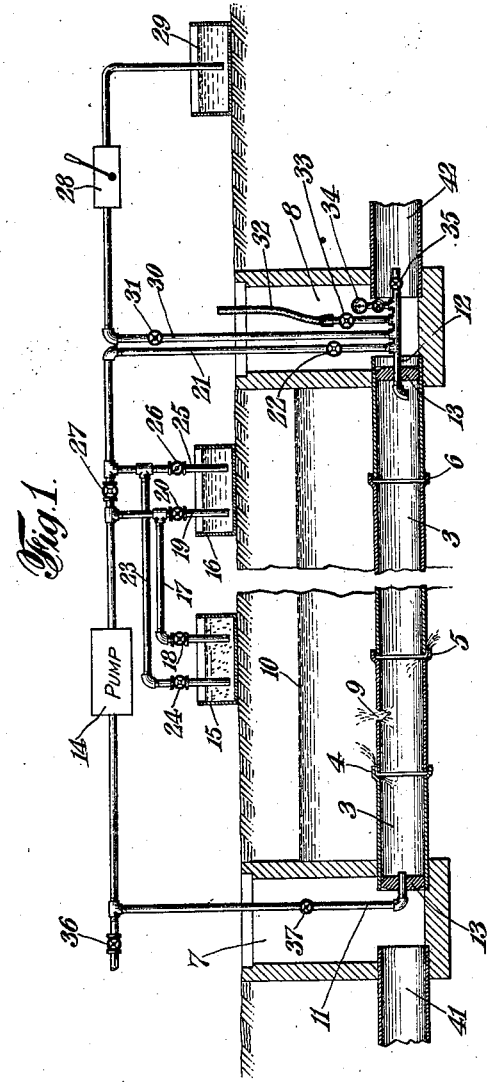
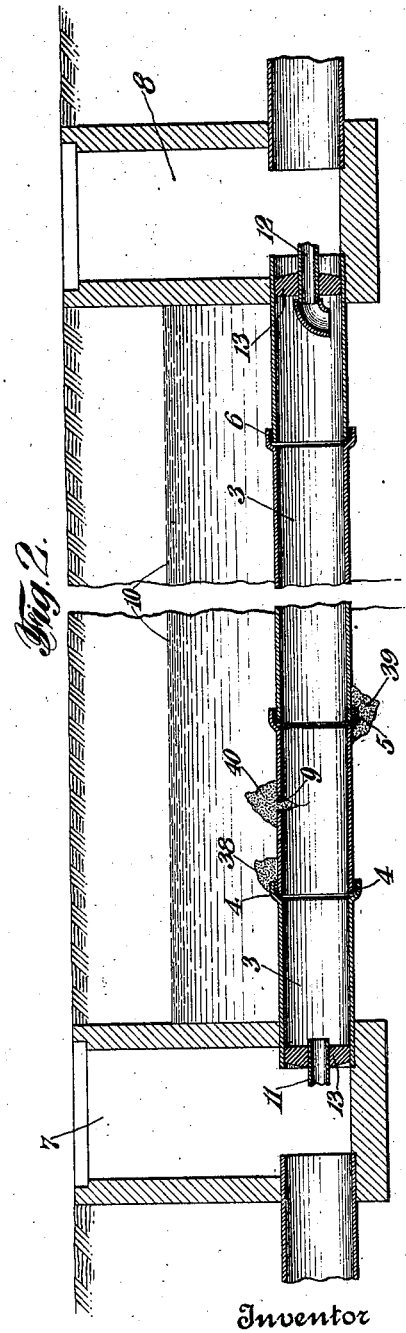
Inventor
John W. Van Denburg
By his Attorneys
Ward Crosby & Smith Patented Nov. 19, 1929

1,736,293

UNITED STATES PATENT OFFICE

JOHN W. VAN DENBURG, OF NEW YORK, N. Y.

METHOD AND APPARATUS FOR REPAIRING LEAKY CONDUITS

Application filed December 14, 1927. Serial No. 239,891.

My invention relates to improvements in methods and apparatus for repairing leaky conduits and while in the broader aspect of the invention the improvements may be applied to the repairing of conduits of many kinds in various places, nevertheless the invention is particularly applicable to the repairing of underground or underwater conduits such as sewer pipe conduits, etc., and which are too small to permit the entry of a workman to effect the repairs.

For example, when a sewage system is most economically constructed for a given community, because of the limited capacities of pumping equipment, disposal facilities or the sewer conduits themselves, it is necessary to limit the amount of infiltration or entrance of ground water from the exterior into the sewer conduit. It is very frequently found that after a sewage system or a part of a system has been completed, the leakage of ground water from the exterior into the sewer conduit due to defects in material or workmanship, or both, is of such proportions as to seriously hinder the effective operation of the system, and possibly in some cases to render it practically useless for a period of time, thus endangering the health of the community served, or others. When such a condition of leakage occurred, the usual remedy in the case of a subterranean conduit of a cross section too small to permit of workmen entering for the purpose of closing the apertures, was to excavate or uncover the conduit, relay the pipe or repair the apertures, and back-fill again. This procedure entailed a very heavy expense and great inconvenience to the community.

Where a leaky conduit is situated in water bearing soil or submerged under water, the leakage into the conduit takes place through defects in the walls or joints of the conduit, and is caused by the excess head or pressure of the liquid on the exterior of the conduit. In the case of a conduit made up of lengths of commercial sewer pipe, these defects may consist of apertures in the walls or joints of the pipe, due to defective manufacture, breakage in handling, imperfect workmanship in sealing the joints, or unequal settlement of the conduit after being placed. When these apertures are effectively sealed against the external head or pressure, no leakage into the conduit can take place. Obviously in a pipe or conduit of considerable length having an internal diameter too small to permit the entry of a workman, it is physically impractical for a workman to seal such apertures by hand from the interior, and it has heretofore been the practice under such circumstances, to uncover or raise the conduit in order to seal the apertures from the exterior by manual operation.

The main object of my invention is to provide a method and apparatus whereby such conduits may be effectively repaired and the leaks sealed in a simple and efficient manner without digging up or uncovering any material length of the conduit and by means of sealing material introduced into the leaks from the inside of the conduit. According to my invention in its preferred form a fluent sealing material is introduced into the interior of a conduit or pipe line, either subterranean or submarine, and forced into and around the outside of the leaking apertures in the walls or joints of the conduit from the interior of the conduit, under a pressure sufficiently greater than the head or pressure of the liquid on the exterior of the conduit. When a sufficient amount of the sealing material has thus been forced into place by the excess pressure, the pressure within the conduit is reduced to approximately that of the external pressure, and so maintained until the sealing material in and around the outside of the apertures has sufficiently solidified to prevent its displacement by the external pressure. Thereafter the conduit is cleared of the material within and it is ready for service free of external leakage. Further objects, features and advantages will more clearly appear from the detail description given below taken in connection with the accompanying sheet of drawings forming a part of this specification.

In the drawings, Fig. 1 is an elevation, more or less diagrammatic, illustrating an arrangement for carrying out my improvements in a preferred form thereof, and Fig. 2 is an elevation illustrating the conduit section of Fig. 1 after it has been repaired.

Referring to the drawings, 3 represents a section of an underground sewer conduit composed of lengths of pipes with joints at 4, 5, 6, etc., the section of conduit extending between manholes 7 and 8, such as are usually provided at convenient points along a sewer. As shown in Fig. 1, the conduit has leaks at the joints 4 and 5 and also a hole or aperture at 9 forming another leak. 10 indicates the height or level of the ground water or water surface which, owing to its static head above the sewer causes the water to flow into the sewer conduit at the leaks mentioned.

In order to provide means for repairing these leaks according to the preferred form of the invention, I provide a pipe connection 11 with one end of the conduit section, and a pipe connection 12 with the other end of the section and except for these connections, the ends of the conduit section are closed as by means of suitable testing plugs 13 through which the pipe connections pass respectively. 14 represents a power pump connected to deliver the sealing medium, etc., under pressure to the conduit section 3 through the pipe connection 11. 15 represents a tank containing a grout of Portland cement or other sealing material and 16 represents a tank or other source of water supply. The pump 14 is adapted to withdraw sealing material from the tank 15 through pipe 17 having a valve at 18 or water from the tank 16 through a pipe 19 having a valve at 20. Thus, according to which of the valves 18 or 20 is open, the pump will deliver sealing material or water to the conduit section 3 through the pipe connection 11.

When the section is filled with sealing material or water, excess may flow out through the pipe connection 12 and up through a pipe 21 having a valve at 22. The valve 22 being open the excess sealing material will be returned to the tank 15 through a pipe 23 having a valve at 24, or if it be water which is being introduced into the conduit section, the excess thereof may be returned to the tank 16 through the pipe 25 having a valve at 26 which is open while the valve 24 is closed. By closing valves 18, 20, 24 and 26 and opening a valve 27, the fluid medium may be kept continuously circulating by the pump through the conduit section without being returned to its tank.

I also preferably provide an auxiliary hand pump 28 by means of which sealing medium or other fluent material may be pumped from a tank 29 through a pipe 30 (having a valve at 31) and thence through the pipe connection 12 into the conduit section. 32 represents an overflow hose leading from the pipe connection 12 and provided with a valve at 33. 34 represents a pressure gauge or other head measuring device connected to the pipe connection 12 and by means of which the pressure of the fluent material in the conduit section 3 may be indicated. 35 represents a valve at the outer end of the pipe connection 12. By opening this valve fluid in the conduit section 3 may be run into the next section of the sewer or conduit. 36 represents a valve by means of which the upper end of the pipe connection 11 may be opened to the atmosphere. This may be desirable when material is pumped into the conduit section 3 by the hand pump 28, or for regulating the pressure in the conduit while pump 14 is operating.

With the above arrangement one may proceed in several ways. For example, the grout or other sealing material may be pumped by pump 14 from tank 15 into the section 3 until it is completely filled. The valves 37, 18, 22 and 24 will be open during this operation and the valves 20, 26, 27, 31, 33, 35 and 36 closed. Then the valve 22 and discharge valve 37 of pump 14 may be regulated to increase the pressure exerted by the fluid grout on the inside of the section 3 until it is sufficiently in excess of the external pressure due to the water level 10 to cause the grout or sealing material to be forced into and through the leaky apertures at 4, 5 and 9, thus completely filling these apertures and leaks and forming exterior masses of the sealing material about the outside thereof as indicated at 38, 39 and 40 in Fig. 2. During this period the pressure exerted by the sealing material on the inside of the section 3 is preferably maintained practically constant and the sealing material is kept in constant circulation by the pump 14. For this purpose valve 27 may be partially opened and valves 18 and 24 closed or partially closed, if desired.

When a sufficient amount of the sealing material has been deposited in and around the exterior of the leaks as at 4, 5 and 9, the internal pressure is reduced to approximately that of the external pressure exerted by the external water and is so maintained while water from the tank 16 is pumped into the section 3 by the pump 14, so that the excess sealing material in the section 3 is gradually removed and replaced by the water. For this purpose valve 20 will be opened and valves 18, 24, 27, 22, 31 and 36 will be maintained closed and the excess sealing material may be allowed to escape through the overflow discharge hose 32 by regulating the valve 33 and the elevation of the end of hose 32, or valve 35 if desired. The operation is continued until all of the excess sealing material in the conduit section 3 is replaced by water. The discharge valve 37 and valves 33 and 35 are then closed and the pump 14 shut down and the pressure in the section 3 maintained to balance the external pressure by the water maintained in the section, so that the external pressure is prevented from forcing the sealing material, which has been introduced to plug the leaks, back into the conduit or away from the leaks. This condition is then continued until the grout or sealing material has set or sufficiently solidified to withstand the external pressure. This may require from a few hours to several days, depending on the nature of the sealing material used and the condition of the conduit section in question. When, however, the sealing material which has thus been introduced from the inside to plug the leaks, has sufficiently set, valves 35, 36 and 37 may be opened and part of the water run out into the next sewer section and then pipe connections and plugs 13 may be removed, leaving the conduit section free from leakage and without having materially reduced the effective cross section of the conduit, and without having had to excavate about the conduit or replacing any part thereof. If desired a quick setting cement may be used as sealing material and after it has been forced into and through the leaking apertures as above described, the body of cement in the conduit may be prevented from hardening by keeping it in circulation or/and by adding loam or other substance to the cement in the conduit to kill the same and prevent it from setting or hardening while the cement in and outside of the leaks is hardening.

It may be desirable as a preliminary procedure to first force water, or a thin mixture of a sealing material and water, by means of the pump 14 into the conduit section 3 and through the leaks and into the surrounding ground to clear out the leaking apertures and loosen the surrounding earth to permit of the more ready entry and retention of the grout or sealing material of proper consistency which may then be introduced as above described.

Where the system is not provided with convenient manholes, it may be necessary to excavate at two or more suitable points in order to make the connections with the ends of the leaky section of the conduit. At times it may be desirable to shut down the pump 14 and close the valves 22 and 37 and increase or regulate the pressure in the conduit section by operation of the auxiliary hand pump to pump in either sealing material or water as the case may be. In some cases it may be advisable to allow a small amount of sealing material to remain in the bottom of the conduit section as an added precaution against leakage through apertures in the bottom where they frequently occur.

To secure the required stoppage, it may be necessary or desirable to carry out the sealing procedure more than once. Where the conduit is in use it may be necessary, during the progress of the repair work, to pump the fluent material ordinarily flowing through the conduit, around the section being repaired or to otherwise arrange for its disposal.

In systems where manholes exist, such as for example as shown in Fig. 1, advantage can be taken of them to maintain the desired pressure in the conduit section being repaired by closing off the outlets, such as at 41 and 42, and filling the manholes to the proper level with water or sealing material, or other material as the case may be, and maintaining communication between the same and the interior of the conduit 3 to secure the pressure therein as desired. When house connections or similar branches lead off from the conduit section being repaired, it may be desirable to excavate and close them off near the main conduit while the sealing operations are in progress, suitable replacement being made after the work has been finished, or the sealing material, etc., may be allowed to flow into such branches and means provided to flush them out at the proper time with a suitable pressure to remove the sealing material therefrom.

From the above it will be seen that I have provided a simple, efficient and relatively inexpensive method and apparatus for repairing subterranean and submarine conduits and a method and apparatus which is especially adapted for the repair of leaky sewer conduits and the like which are too small to permit the entry of a workman to repair the same. The cost is very much less than when repairs are made by other methods entailing the excavation or uncovering of long lengths of the conduit either from the surface or by tunneling, all of which is not only expensive but difficult, if not impracticable, in certain cases where the conduit passes through wet or difficult ground such as quicksand, or under water. Where the conduit lies under streets or other traveled ways, my improvements obviate the tearing up or blocking of such thoroughfares and also permit such repair work to be done where a structure or water course above the conduit makes it difficult or impractical to reach the leaks therein from the outside. As it is not necessary to dig around or tear up the conduit, breakage and waste from this cause are avoided. A comparatively small force of workmen is required as most of the work is accomplished by mechanical means. The work can be executed rapidly and at times when the working area is most available, and the same need not be hampered or obstructed by any of the apparatus during the time required for the sealing material to set or solidify, since during such time the apparatus above ground may be removed. Also, delay and inconvenience caused by waiting for back fills to settle, and the replacing of paving or other structures, etc. are avoided. Also, loss of time and delay due to inclement weather conditions, such as snow, frozen ground, etc., are avoided, since it is not necessary to excavate and the higher temperature ordinarily found in such sewer or similar conduits is sufficient to permit the work to proceed in cold weather. On account of the conduit not being disturbed, the possibility of defects due to settlement after repair is substantially avoided. All of these objects are accomplished by introducing a suitable fluent sealing material into the conduit and introducing and forcing the same into the leaks from the interior of the conduit, after which the sealing material may be removed so that the conduit is left without having its effective cross sectional area materially reduced.

While I have described my improvements in great detail and with respect to certain preferred forms, I do not desire to be limited to such details or forms since many changes and modifications may be made and the invention embodied in widely different forms without departing from the spirit and scope of the improvements in their broader aspects. Hence I desire to cover all modifications and forms coming within the language or scope of any one or more of the appended claims.

What I claim as new and desire to secure by Letters Patent is:

1. The method of repairing leaky conduits which comprises introducing a sealing material into the conduit and forcing it into the leaks, removing the sealing material from the inside of the conduit before it sets and maintaining sufficient pressure in the conduit to prevent the sealing material which remains at the leaks from returning into the conduit while it is setting.

2. The method of repairing leaking pipe conduits under ground or water which are too small to permit the entry of a workman therein, which comprises introducing a fluent sealing material into the conduit under sufficient pressure to cause it to pass into the leaks, removing the sealing material from the inside of the conduit before it sets therein and maintaining sufficient pressure in the conduit to prevent the sealing material which remains at the leaks from returning into the conduit while it is setting.

3. The method of repairing leaking pipe conduits under ground or water which are too small to permit the entry of a workman therein, which comprises pumping a stream of fluent sealing material through the conduit and under sufficient pressure to cause it to pass into the leaks to close the leaks, and removing excess of sealing material remaining in the conduit.

4. The method of repairing leaking pipe conduits under ground or water which are too small to permit the entry of a workman therein, which comprises introducing a fluent sealing material into the conduit under sufficient pressure to cause it to pass into the leaks, maintaining the sealing material under a lesser pressure while the same is setting and removing the excess sealing material from the inside of the conduit before it sets therein.

5. The method of repairing leaking underground or underwater conduits which comprises introducing a sealing material into the conduit without removing the same from the ground or water, the sealing material being introduced under sufficient pressure to cause it to pass into the leaks, and removing the remaining sealing material from inside the conduit by the use of a circulating liquid.

6. The method of repairing, from the inside, leaky conduits which are subject to external liquid pressure and which are too small to permit the entry of a workman, and without permanently blocking the conduit or materially reducing its cross-sectional area, which comprises filling the leaking apertures in the conduits with a sealing material by depositing it therein under pressure from the inside of the conduit, removing the excess of the sealing material from the inside of the conduit before it sets, and substituting therefor a non-setting material to maintain sufficient pressure on the inside of the conduit to withstand the external pressure at the leaks until the sealing material in or around the leaks has sufficiently set to withstand said external pressure, and finally removing said non-setting material.

7. The method of sealing apertures in a conduit which comprises plugging the apertures with sealing material by depositing the same therein from the inside of the conduit and holding it in place while it is setting by introducing a non-setting fluent material in the conduit.

8. The method of repairing leaky underground or underwater conduits which are too small to permit the entry of a workman, which comprises forcing grout into the conduit with sufficient pressure to cause it to pass into the leaks and thereafter passing a stream of liquid through the conduit to remove the excess grout and to maintain sufficient pressure upon the grout in the leaks to hold the same in place during setting thereof.

9. The method of repairing leaky underground or underwater conduits which are too small to permit the entry of a workman, which comprises forcing grout into the conduit with sufficient pressure to cause it to pass into the leaks, displacing the excess of grout in the conduit with water and maintaining the water in the conduit under sufficient pressure to hold the grout at the leaks in place until said grout has set.

10. Apparatus for repairing leaky underground or underwater conduits comprising pipe connections to the respective ends of a section of the conduit, means for closing the ends of said section except for said pipe connections, and means for pumping a sealing material into the section through the pipe connection at one end.

11. Apparatus for repairing leaky underground or underwater conduits comprising pipe connections to the respective ends of a section of the conduit, means for closing the ends of said section except for said pipe connections, and means for pumping a sealing material into the section through the pipe connection at one end, and means whereby the excess sealing material may be removed through the pipe connection at the opposite end of the section.

12. Apparatus for repairing leaky conduits comprising pipe connections for the respective ends of a section of the conduit, a container for sealing material, a source of water supply, a pump and connections whereby the pump may pump sealing material from its container or water from said source into the section through the pipe connection at one end thereof and out through the pipe connection at the other end thereof.

13. Apparatus for repairing leaky conduits comprising pipe connections for the respective ends of a section of the conduit, a container for sealing material, a source of water supply, a pump, and connections whereby the pump may pump sealing material from its container or water from said source into the section through the pipe connection at one end thereof and out through the pipe connection at the other end thereof, and means whereby the sealing material leaving the section may be returned to its container.

14. Apparatus for repairing leaky underground or underwater conduits, comprising means for introducing a sealing material into one end of a section of the conduit and a pipe connection extending from one end of the conduit into which the sealing material may flow, whereby the sealing material may be introduced and maintained in the conduit section under pressure.

15. Apparatus for repairing leaky underground or underwater conduits, comprising means for introducing a sealing material into one end of a section of the conduit and a pipe connection extending from the other end of the conduit into which the sealing material may flow whereby the sealing material may be introduced and maintained in the conduit section under pressure, and means connected to indicate the pressure in said conduit section.

16. The method of sealing apertures in a leaky conduit too small to permit the entry of a workman, which comprises plugging the same with sealing materials deposited under pressure from the inside of said conduit, by first forcing water through the apertures to clear said apertures and loosen surrounding medium, thereafter forcing the sealing materials through and around the outside of said apertures and holding it in place by substantially balanced pressures, until said sealing material is set.

17. The method of repairing leaking underground or underwater conduits which are too small to permit the entry of a workman therein, which comprises introducing a fluent sealing material into the conduit under sufficient pressure to cause it to pass into the leaks and then preventing the hardening of the excess fluent material in the conduit, while the sealing material in and around the leaks hardens, and then removing the material inside the conduit.

18. The method of sealing apertures in a leaky conduit too small to permit the entry of a workman, which comprises plugging the same with sealing materials deposited under pressure from the inside of said conduit, by first forcing a mixture of water and sealing material through the apertures to clear said apertures and deposit a ground work outside said apertures, thereafter forcing the sealing materials through and around the outside of said apertures and holding it in place by substantially balanced pressures, until said sealing material is set.

In testimony whereof I have signed my name to this specification.

JOHN W. VAN DENBURG.